(12) United States Patent
Lange et al.

(10) Patent No.: US 10,554,290 B2
(45) Date of Patent: Feb. 4, 2020

(54) DIGITAL REPEATER SYSTEM

(71) Applicant: CommScope Technologies LLC, Hickory, NC (US)

(72) Inventors: Keld Knut Lange, Oetisheim (DE); Luigi Tarlazzi, Bagnacavallo (IT)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/302,334

(22) PCT Filed: Apr. 7, 2015

(86) PCT No.: PCT/US2015/024685
§ 371 (c)(1),
(2) Date: Oct. 6, 2016

(87) PCT Pub. No.: WO2015/157265
PCT Pub. Date: Oct. 15, 2015

(65) Prior Publication Data
US 2017/0026107 A1 Jan. 26, 2017

(30) Foreign Application Priority Data
Apr. 8, 2014 (EP) ..................................... 14163855

(51) Int. Cl.
*H04B 7/155* (2006.01)
*H04J 3/08* (2006.01)

(52) U.S. Cl.
CPC ............ *H04B 7/15542* (2013.01); *H04J 3/08* (2013.01)

(58) Field of Classification Search
CPC ............................... H04B 7/15542; H04J 3/08
(Continued)

(56) References Cited

U.S. PATENT DOCUMENTS

| 6,226,507 B1 * | 5/2001 | Ramesh ................. H04B 7/082 375/347 |
| 6,426,983 B1 * | 7/2002 | Rakib ................... H04B 1/7102 375/346 |

(Continued)

FOREIGN PATENT DOCUMENTS

| EP | 0274857 | 7/1988 |
| WO | WO 2011156465 A1 * | 12/2011 ........... H04W 52/146 |

OTHER PUBLICATIONS

International Search Report, "International Search Report and Written Opinion from PCT Application No. PCT/US2015/024685", dated Jul. 7, 2015, pp. 1-13, Published in: WO.

(Continued)

*Primary Examiner* — Kevin M Burd
(74) *Attorney, Agent, or Firm* — Fogg & Powers LLC

(57) ABSTRACT

A digital repeater system for repeating RF signals comprises: a receiving section for receiving an RF input signal, the RF input signal comprising at least one frequency band including a multiplicity of subbands associated with a multiplicity of communication channels; and at least one transmitting section for transmitting the RF output signal. The receiving section is constituted to digitize the RF input signal to obtain a digital input signal and to isolate, within the digital input signal, the multiplicity of subbands from each other to obtain a multiplicity of digital subband signals. The at least one transmitting section is constituted to combine the digital subband signals to obtain a digital output signal and to convert the digital output signal to an RF output signal. In addition, the receiving section comprises a power profile estimation unit for determining a power estimate for each digital subband signal associated with the multiplicity of subbands and a muting device for muting a digital subband signal of a particular subband based on the power estimate. In this way a digital repeater system for (Continued)

repeating RF signals is provided which allows for a detection of unused portions of a frequency band in order to improve the performance of the overall system.

20 Claims, 3 Drawing Sheets

(58) Field of Classification Search
USPC .......................................................... 375/211
See application file for complete search history.

(56) References Cited

U.S. PATENT DOCUMENTS

| | | | |
|---|---|---|---|
| 6,456,657 B1* | 9/2002 | Yeap | H04B 1/667 |
| | | | 375/240.12 |
| 7,035,671 B2 | 4/2006 | Solum | |
| 7,512,419 B2 | 3/2009 | Solum | |
| 2004/0110520 A1 | 6/2004 | Barbara et al. | |
| 2004/0203394 A1 | 10/2004 | Solum | |
| 2005/0286619 A1* | 12/2005 | Haddadin | H04B 1/0003 |
| | | | 375/222 |
| 2006/0019603 A1* | 1/2006 | Pergal | H04B 7/15542 |
| | | | 455/15 |
| 2006/0039414 A1* | 2/2006 | Ito | H04J 3/1611 |
| | | | 370/535 |
| 2006/0183420 A1 | 8/2006 | Solum | |
| 2009/0196215 A1 | 8/2009 | Sabat et al. | |
| 2011/0002367 A1 | 1/2011 | Kummetz | |
| 2011/0243127 A1 | 10/2011 | Li et al. | |
| 2012/0106340 A1 | 5/2012 | Hoymann et al. | |
| 2012/0263163 A1* | 10/2012 | Burzigotti | H04B 7/18515 |
| | | | 370/344 |
| 2012/0327795 A1 | 12/2012 | Mallik et al. | |
| 2013/0095870 A1 | 4/2013 | Phillips et al. | |

OTHER PUBLICATIONS

European Patent Office, "Extended Search Report from EP Application No. 14163855.1 dated Jul. 18, 2014", "from Foreign Counterpart of U.S. Appl. No. 15/302,334", dated Jul. 18, 2014, pp. 1-8, Published in: EP.

European Patent Office, "Communication pursuant to Article 94(3) EPC from EP Application No. 14163855.1 dated Aug. 8, 2018", from Foreign Counterpart to U.S. Appl. No. 15/302,334, dated Aug. 8, 2018, pp. 1-5, Published: US.

* cited by examiner

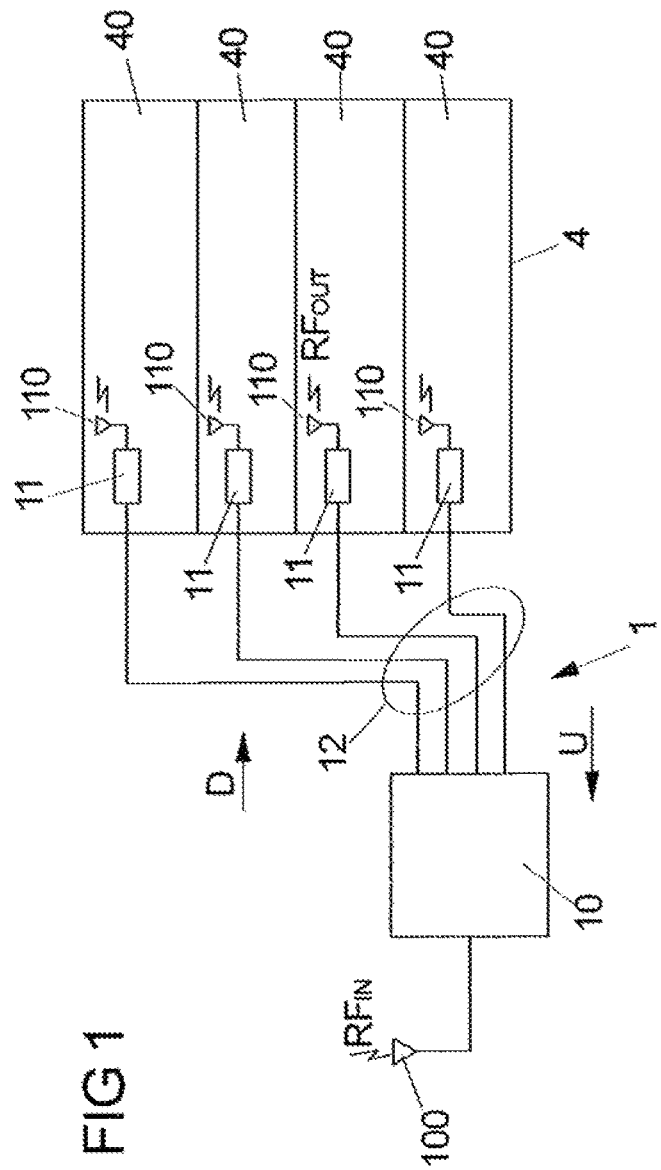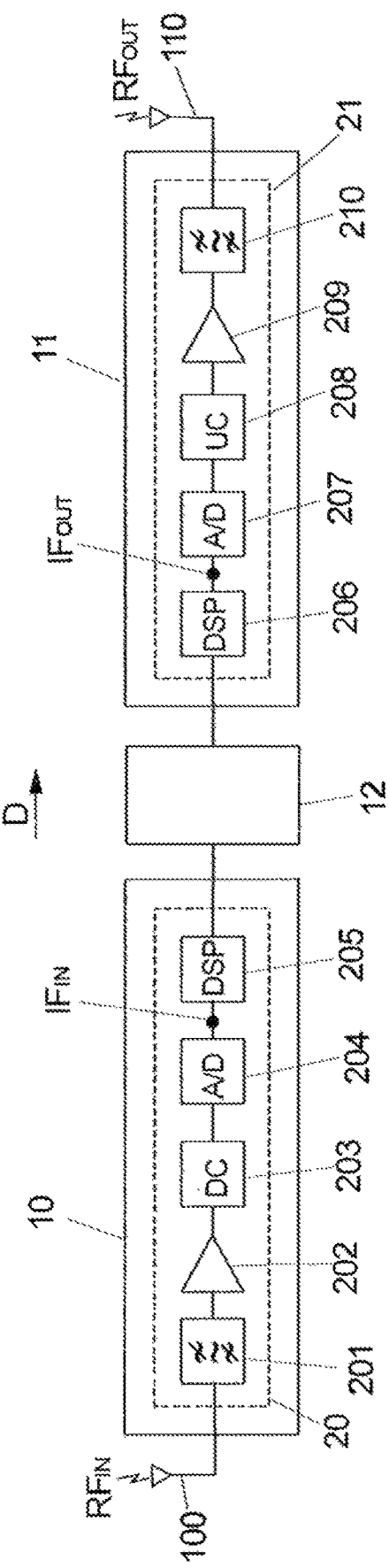
FIG 1
FIG 2

DIGITAL REPEATER SYSTEM

CROSS-REFERENCE TO RELATED APPLICATIONS

This application is a U.S. National Stage Application of PCT Application Serial No. PCT/US2015/024685, filed Apr. 7, 2015, and titled "DIGITAL REPEATER SYSTEM," which claims the benefit of EP Patent Application Serial No. 14163855.1, filed Apr. 8, 2014, and titled "DIGITAL REPEATER SYSTEM," the contents of all of which are hereby incorporated by reference.

BACKGROUND

This application relates to a digital repeater system for transmitting signals and to a method for operating a digital repeater system.

A digital repeater system of this kind typically comprises a receiving section for processing a digital input signal, the digital input signal comprising at least one frequency band including a multiplicity of subbands associated with a multiplicity of communication channels. The digital repeater system furthermore comprises at least one transmitting section for transmitting an output signal. The receiving section is constituted to isolate, within the digital input signal, the multiplicity of subbands from each other to obtain a multiplicity of digital subband signals. The at least one transmitting section is constituted to combine the digital subband signals to obtain an output signal for transmission.

A digital repeater system of this kind may be a classical "off-air" repeater which receives signals via an air interface, operates on the received signals and transmits the processed signals again via the air. A digital repeater system of this kind however may in general be a system using any kind of donor input and transport medium connecting a receiving section and a transmitting section.

A digital repeater system in this regard may also be a distributed system, such as a distributed antenna system, in which signals are distributed to multiple distributed antenna units for transmission (in a downlink direction) or are received by the distributed antenna units and combined (in an uplink direction).

EP 1 324 514 A2 discloses a repeater system for transmitting receiving RF signals to and from an area obstructed by a mountain, a building or the like. One antenna is linked to for example a base station antenna of a cell in a cellular network, and another antenna is directed towards the obstructed area. Signals are received and digitally separated into a number of different frequency channels. The separated channels are then processed and recombined for transmission into the obstructed area to mobile users located in that obstructed area. For separating the RF signals into the different frequency channels, a channelizer is provided which comprises a multiplicity of digital downconverters and a multiplicity of digital upconverters.

EP 1 109 332 A2 discloses a digital repeater for receiving and retransmitting radiofrequency (RF) signals in which a first RF signal is downconverted to an intermediate-frequency (IF) signal, converted into a digital signal and processed with a digital signal processor. Upon amplification the digital signal is amplified and converted into an analog signal for retransmission.

EP 1 303 929 B1 discloses a digital repeater system in which a host unit is connected via a transport medium (such as optical fibers) to a multiplicity of remote units. The remote units for example may be distributed throughout a building. In a downlink direction, the host unit digitizes an incoming RF signal and transmits the digitized RF signal via the transport medium to the remote units for retransmission. In an uplink direction, the remote units receive an incoming RF signal, digitize it and transmit it to the host unit for transmission towards an outside communication network.

Nowadays, repeater systems are constituted to serve a wide frequency band, for example a complete 3GPP band. Herein, a frequency band typically contains multiple carriers carrying information according to different communication technologies and standards such as GSM, UMTS, LTE or the like.

Within such repeater systems, the full spectrum of the supported band may not be used at all times. If, however, signals within a subband are processed and transported in a repeater system which currently do not contain useful information, but represent only noise, this may degrade performance of the system and may add to the overall noise of the retransmitted RF signals.

There hence is a desire to detect unused spectrum within a supported frequency band in order to be able to adapt the processing of the frequency band for an optimization of the system behaviour.

EP 0 681 374 A1 discloses an analog repeater which processes analog signals in an uplink and a downlink direction in a channelized fashion. Herein, the different channels may be muted by evaluating an uplink spectrum.

SUMMARY

One embodiment is directed to a digital repeater system for repeating RF signals and a method for operating such a digital repeater system which allow for a detection of unused portions of a frequency band in order to improve the performance of the overall system.

In one embodiment, the repeater system comprises
a power profile estimation unit for determining a power estimate for each digital subband signal associated with the multiplicity of subbands and
a muting device for muting a digital subband signal of a particular subband based on the power estimate.

By means of the power profile estimation unit in particular a power estimate of a digital subband signal associated with a particular subband may be determined as a function of time such that a momentary power estimate for a digital subband signal of a particular subband is obtained. Dependent on the power estimate, then, a digital subband signal may be muted by means of the muting device if it is detected that the power estimate is low and hence the digital subband signal is found to contain little power. For this, the power estimate is for example compared with a threshold and, if it is found that the power estimate is smaller than the threshold, it is assumed that the subband contains no signals carrying information, but only noise. In that case, the digital subband signal of the particular subband is muted and hence is not processed by the transmitting section for retransmission.

The muting decision may be based on the comparison of a momentary power estimate of an overall subband signal to a fixed threshold, wherein the threshold may also be dynamically adjustable. The muting decision however may also be a complex decision based for example on detecting a power estimate of interfering signals in a subband, intermodulation products or the like in order to mute signals relating to such interfering signals of intermodulation products.

In this regard it shall be noted that the power profile estimation unit and the muting device may be located anywhere in the repeater system. The power profile estimation unit and the muting device may in particular be part of the receiving section, but may also be part of the transmitting section.

In addition, the receiving section and the transmitting section may be implemented as separate units, but also may be part of a single unit. For example, in a classical "off-air" repeater a receiving section and a transmitting section may be enclosed in a single repeater unit. In a distributed repeater system, in contrast, a host unit and multiple remote units connected to the host unit via a suitable transport medium, such as an electrical or optical transport medium for analog or digital transmission, may be present, the host unit for example comprising a receiving section (for reception in the downlink direction) and a transmitting section (for transmission in the uplink direction) and likewise each remote unit for example comprising a transmitting section (for transmission in the downlink direction) and a receiving section (for reception in the uplink direction).

Also, functions of the receiving section and/or functions of the transmitting section may be distributed over multiple units. For example, in the uplink direction signals may be received at remote units and may be aggregated for transport to an intermediate unit. In the intermediate unit the aggregated signal may be processed and may be transported to a (separate) host unit for transmission via the host unit. Functions of the receiving section in this example are taken over by the remote units in connection with the intermediate unit.

The receiving section may, in one embodiment, be constituted to receive an RF input signal and to digitize the RF input signal to obtain the digital input signal. Vice versa, the at least one transmitting section may be constituted to combine the digital subband signals to obtain a digital output signal and to convert the digital output signal to an RF output signal for transmission. The repeater system hence is constituted to digitize a received RF signal, to process it in a digitized fashion and to retransmit it as an RF signal.

In another embodiment, a digital input signal may also be directly fed to the receiving section via a digital link and/or a digital output signal may be transmitted to a digital network via a digital link. Such an embodiment may for example embody a distributed antenna system (DAS).

By determining the power estimate and by comparing the power estimate for a particular subband for example to a (pre-determined) threshold it can be made sure that only such signals with a sufficient signal-to-noise ratio (SNR) are processed and transported in the digital repeater system. For example, only signals having an SNR larger than 6 dB may be transported, whereas all other signals are muted.

The threshold in this regard may be fixed or may dynamically be adjusted based on for example on a power distribution associated with the (broadband) input signal from which the (narrowband) subband signals are derived.

Muting a digital subband signal in the context of this text is to be understood as cancelling the signal such that it does not add to the retransmitted RF signal. For this, the digital subband signal may be cancelled out, i.e. all digital sample values are set to zero.

Within the digital repeater system the digital subband signals of the digital subbands of the overall frequency band are processed in an isolated fashion. For separating the digital subband signals from each other, the receiving section for example comprises a multiplicity of demodulators for demodulating the digital input signals into the baseband to obtain digital subband signals located in the baseband. One demodulator is associated with one subband and demodulates the digitized RF input signal such that the digital subband signal associated with the subband is obtained.

The subband signals generally may overlap in the frequency domain. By means of the demodulators the separate subband signals are extracted from the overall signal such that separate subband signals for processing in the repeater system are obtained.

The demodulator outputs advantageously a complex digital subband signal having an in-phase component and a quadrature component, i.e. signals with the same frequency and amplitude, but being 90° out of phase.

The power profile estimation unit may, in that case, in an easy fashion determine a momentary power estimate at a particular digital sample time by adding the squared digital sample values of the in-phase component and the quadrature component. From the in-phase component and the quadrature component the power estimate hence may be obtained in a computationally efficient manner by simply adding the squared sample values of the in-phase and the quadrature components of the digital subband signal. By determining a power estimate for each digital subband signal as a function of time power estimate profiles for the various subbands are obtained such that a muting decision may be taken in a time-dependent manner based on the time-dependent power estimate profiles.

In order to isolate the digital subband signals from each other, the receiving section in one embodiment comprises a multiplicity of digital filters for digitally filtering the digital subband signals. The digital filters, in particular, are constituted as lowpass filters having cut-off frequencies corresponding to the bandwidths of the different subbands. Herein, the lowpass filters do not necessarily have the same cut-off frequency, but the cut-off frequencies of the digital filters may differ dependent on the particular subbands to be processed by the repeater system. The filter coefficients of the digital filters herein may be adjusted to adapt the repeater system to the particular subbands to be processed by the system.

Both the demodulators and the digital filters may be configurable by software such that the repeater system may be adjustable to process different subbands and bands. Hence, the repeater system can be adapted in its channel setup such that, depending on which subbands one or multiple operators wish to repeat, the demodulators and filters can be configured to process a particular set of subbands at a particular set of carrier frequencies and having a particular set of bandwidths (wherein the bandwidths of the different subbands may differ).

A subband may correspond to a particular communication channel associated with a carrier at a particular carrier frequency. Or a subband may be associated with multiple communication channels having carrier frequencies within the frequency range of the subband.

In this regard it is to be noted that a subband may correspond to a particular communication channel or a multiplicity of particular communication channels. This however is not necessary. It also is conceivable that the frequency band is divided, by means of the filters, into (overlapping or non-overlapping) subbands which do not correspond to actual communication channels, but merely represent frequency portions of the overall frequency band which may be recombined after processing to again obtain the overall signal of the entire frequency band. In this way for example broadband signals such as signals using a spread spectrum code multiplexing technique (e.g., as in CDMA or UMTS systems) may be (artificially) split into subbands of a smaller bandwidth, which then may be processed separately and afterwards recombined.

The subbands each may for example have a narrow bandwidth of for example in between 150 kHz and 1 MHz, for example between 180 kHz and 400 kHz. The subbands may all have the same (narrow) bandwidth, or the subbands may have different bandwidths. The digital repeater system may for example be constituted to process narrowband digital subband signals within a complete (uplink or downlink) 3GPP band.

By means of the digital filters all such portions of the output of the demodulators are cut off which do not belong to the various subbands such that the subband signals are isolated from each other in the baseband.

After passing the digital filters the digital subband signals may be fed to downsamplers for decimating the sampling rate of the digital subband signals. The power profile estimation unit is arranged after the downsamplers and acts onto the downsampled digital subband signals. The in-phase components and the quadrature phase components of the complex digital subband signals herein may be decimated to a minimum acceptable value for the signals in the baseband.

The decision whether to mute a digital subband signal or not is taken dependent on the power estimate derived from the (complex) digital subband signal associated with the particular subband. To mute the digital subband signal of a particular subband the muting device for example may comprise a switch for switching-off the digital subband signal for example if the power estimate for the particular subband is found to be smaller than a predetermined threshold or if interfering signals or intermodulation products are detected.

The switching-off of a digital subband signal may be implemented in hardware or software. For example, the switching-off of a digital subband signal may be implemented by setting all sample values of the digital subband signal to zero.

The muting device may be configured to take a muting decision based on one power estimate derived from the (complex) digital subband signal at a particular sampling time. Hence, for each sampling time a power estimate for the digital subband signal is determined and based on this power estimate it is decided whether to mute a channel or not. The muting decision hence is taken on a sample-by-sample basis and hence may change with time in a rather fast way.

In one embodiment, the muting device may for example be configured to take a muting decision based on a power estimate derived from the (complex) digital subband signal periodically after a predefined number of sampling times, for example at every second or third sampling time. The muting decision is hence not taken at every sampling time, but at a predefined temporal distance corresponding to the time period between for example two or three samples.

In one embodiment, the receiving section is connected to the transmitting section via a transport medium, such as an air interface or one or multiple optical fibers. Via the transport medium the several digital subband signals associated with the separate subbands are transported to the transmitting section, which may be remote from the receiving section. Herein, prior to transmitting the digital subband signals via the transport medium, the digital subband signals which are not muted and which shall be transported may be fed to an aggregation unit for aggregating the signals to be transported via the transport medium. Via the aggregation unit the digital subband signals may be combined into a combined signal to be transported via the transport medium, wherein on the side of the transmitting section the transported signal may again be separated into the different digital subband signals and may be fed to modulators of the transmitting section for modulating the digital subband signals into an intermediate frequency band. The modulated signals are then fed to a combiner to combine the modulated digital subband signals to obtain the digital output signal for transmission from the transmitting section.

The muting decision may also be fed to the aggregation unit of the receiving section such that, based on the muting decision, also the aggregation unit and transport medium may reconfigure themselves to avoid transporting any muted signals. Hence, if a digital subband signal is muted, this signal will not be transported via the transport medium.

The power profile estimation unit and the muting device herein may take their muting decision in a rather fast manner, for example, after a power estimate for a sample of the (complex) digital subband signal is determined. In contrast, the aggregation unit may take a decision for reconfiguring the transport network in a slower manner, such that a reconfiguration takes place not after each power estimate for each sample, but in a slower manner, for example only after a decision to mute a particular digital subband signal or not does not change for a pre-determined number of samples.

A system and method for aggregating signals to be transported via a transport medium is for example described in co-pending international (PCT) application with application number PCT/US2015/018922, which shall be incorporated by reference herein.

Background of this is that, in particular in the uplink direction, the combination of broadband signals received from multiple remote units at a host unit may lead to an increase of the noise level in the combined signal and hence to a degradation in the signal-to-noise ratio (SNR) of the combined signal. This is due to the fact that any broadband signal from any remote unit contains noise, which adds up upon combining the different signals from the different remote units. Such degradation of the SNR is disadvantageous and hence shall be avoided or at least reduced.

By splitting up a broadband input signal, in particular in the uplink direction, into several (narrowband) subband signals and by processing the subband signals separately the effect of SNR degradation may at least be reduced. By selecting only those subband signals which include information (which is judged by the power contained in the signal) for transport via the transport medium and by combining only the useful, information-containing signals of one or multiple remote units at the host unit, it can be avoided that unnecessary noise (i.e., noise of subband signals containing no information) adds to the noise of the combined signal transmitted by the host unit for example to one or multiple base stations connected with the host unit.

The aggregation unit hence is configured to select only a subset of the subband signals of a remote unit, corresponding to the unmuted signals, for transport via the transport medium. The selection may then also be taken into account at the host unit for combining the subband signals of one or multiple remote units into a combined output signal for routing to one or multiple base stations such that only those subband signals are combined which contain useful information.

The host unit in this regard may also be constituted to take, for combining the subband signals, a mapping to antenna ports of one or multiple base stations into account. By combining only those subband signals (of one or multiple remote units) which shall be transmitted to a particular antenna port of a particular base station into a combined signal it can be obtained that only the noise of the subband signals to be routed to the particular antenna port in the uplink direction adds up, leading to an improvement of the SNR in the combined signal.

In one embodiment, the digital repeater system comprises a host unit and one or multiple remote units connected to the host unit. The host unit may for example be located outside a building, whereas the remote units are distributed over different floors of the building to provide coverage within the building.

Both the host unit and the remote units may comprise a receiving section and a transmitting section of the kind described above. Namely, in a downlink direction the receiving section of the host unit receives an RF signal from one or multiple base stations of one or multiple communication networks via an air interface, processes the RF signal and provides it to the transmitting sections of the different remote units for retransmission via the remote units. In the uplink direction, in contrast, the receiving section of a remote unit receives an RF signal from inside the building and provides the RF signal, after processing, to the transmitting section of the host unit for transmission towards an outside communication network, in particular for routing to antenna ports of one or multiple base stations of one or multiple communication networks of equal or different radio access technologies.

In a particular example, the functions of the receiving section and the transmitting section may also be distributed over the host unit and the one or multiple remote units or one or multiple intermediate units located in between the host unit and the remote units. For example, in the uplink direction an RF signal may be received at one or multiple remote units and may be forwarded to an intermediate unit located in the vicinity of the host unit. In the intermediate unit the signals received from the remote units are processed and aggregated and provided to the host unit for transmission to an outside network. In this example the power profile estimation unit and the muting device may for example be located in the intermediate unit such that a majority of the processing on the receiving side is carried out in the intermediate unit.

The digital repeater system hence provides a distributed coverage solution by means of which an RF signal comprising a frequency band including various subbands associated with various radio technologies such as a GSM, UMTS, LTE or the like, for example all signals in a 3GPP frequency band, may be distributed via a host unit to multiple remote units providing coverage in an obstructed area. The remote units may be connected to the host unit for example via a network of optical fibers or via an air interface or another RF connection means.

Another embodiment is directed to a method for operating a digital repeater system for transmitting signals. In the method,
- a receiving section processes a digital input signal, the digital input signal comprising at least one frequency band including a multiplicity of subbands associated with a multiplicity of communication channels, and
- at least one transmitting section transmits an output signal, wherein the receiving section isolates, within the digital input signal, the multiplicity of subbands from each other to obtain a multiplicity of digital subband signals, and wherein the at least one transmitting section combines the digital subband signals to obtain an output signal for transmission. The repeater system comprises

- a power profile estimation unit which determines a power estimate for each digital subband signal associated with the multiplicity of subbands, and
- a muting device which mutes a digital subband signal of a particular subband based on the power estimate.

The advantages and advantageous embodiments described above for the digital repeater system equally apply also to the method such that it shall be referred to the above.

BRIEF DESCRIPTION OF THE DRAWINGS

FIG. 1 shows a schematic overview of a digital repeater system comprising a host unit connected to multiple remote units;

FIG. 2 shows a schematic drawing showing functional processing blocks in the host unit and a remote unit for digital processing of an RF signal in a downlink direction;

DETAILED DESCRIPTION

Figure 3:
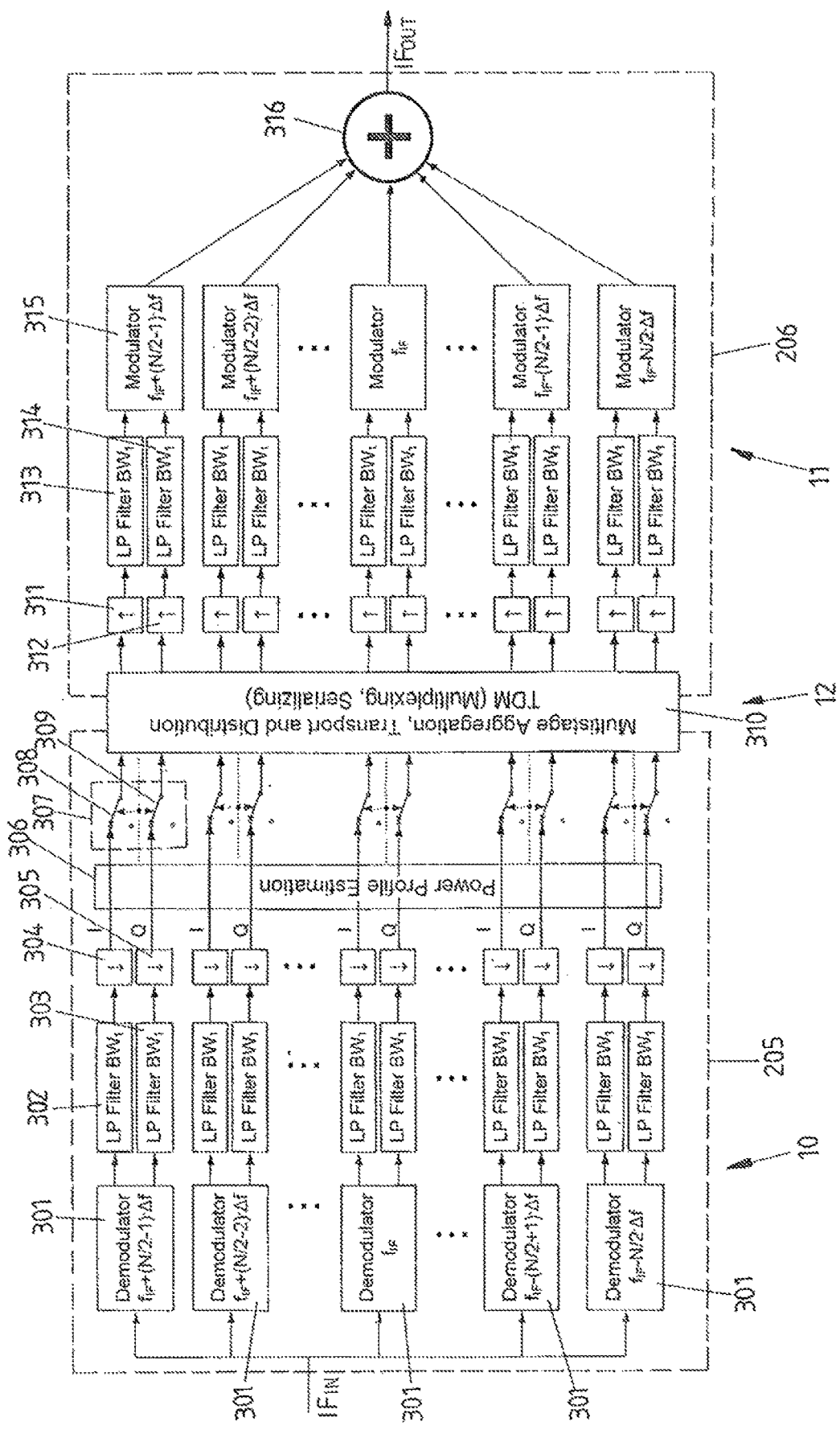
FIG. 3 shows a functional diagram of a digital signal processor on the side of the host unit and on the side of the remote unit.

FIG. 1 shows, in a schematic drawing, a digital repeater system 1 comprising a host unit 10 and multiple remote units 11. The host unit 10 may for example be located outside a building 4 and comprises an antenna 100 via which the host unit 10 is for example connected to one or multiple base stations of one or multiple communication networks using an air interface. The remote units 11 are located on different floors 40 of the building 4 and serve to provide coverage throughout the different floors 40 of the building 4. The remote units 11 are connected to the host unit 10 via a transport medium 12, for example a network of optical fibers, and hence are in communication connection with the host unit 10. Each remote unit 11 comprises an antenna 110 via which the remote unit 11 for example is connected to a mobile device of a user on a floor 40 of the building 4.

In a downlink direction D, an RF input signal $RF_{IN}$ is received via the antenna 100 at the host unit 10, is processed within the host unit 10 for transporting it via the transport medium 12 to the different remote units 11 and, after further processing, is send out via the antennas 110 as an RF output signal $RF_{OUT}$. The RF output signal $RF_{OUT}$ may be received by a mobile device in the building 4.

Vice versa, in an uplink direction an RF signal received at the antenna 110 of a remote unit 11 is fed via the transport medium 12 to the host unit 10 and is retransmitted via the antenna 100 towards an outside communication network.

The digital repeater system 1 performs a digital processing of the RF signal, as functionally shown in FIG. 2. FIG. 2 herein depicts such functional entities of the host unit 10 and a remote unit 11 connected via the transport medium 12 to the host unit 10 which are used in the downlink direction D for processing the RF input signal $RF_{IN}$ for retransmission.

In the embodiment of FIG. 2, the host unit 10 comprises a receiving section 20 for processing an RF input signal $RF_{IN}$ received by the antenna 100. In particular, the receiving section 20 comprises an RF filter 201 in the shape of a bandpass filter for filtering out a frequency band to be processed and transported for retransmission. From the RF filter 201 the RF input signal $RF_{IN}$ is fed to a low noise amplifier 202 and to a downconverter 203 for downconverting the RF signal into an intermediate frequency band. After that, the signal is fed to an analog-to-digital converter 204 for digitizing the RF signal, such that an (intermediate-frequency) digital signal $IF_{IN}$ is obtained.

The digital signal $IF_{IN}$ is fed to a digital signal processor (DSP) 205 and is digitally processed in the digital signal processor 205, as shall be described in more detail below.

After digital signal processing, the processed signal is, via the transport medium 12, transported to a digital signal processor 206 of a transmitting section 21 of a remote unit 11, in which the signal is further processed such that a digital signal $IF_{OUT}$ in the intermediate frequency range is obtained. This digital signal $IF_{OUT}$ is converted to an analog RF signal by means of a digital-to-analog converter 207, is upconverted by an upconverter 208, is power-amplified by a power amplifier 209, is filtered by an RF filter 210 in the shape of a bandpass filter and is transmitted as an RF output signal $RF_{OUT}$ via the antenna 110 of the remote unit 11.

In the uplink direction U, essentially the same takes place, wherein in that case an RF input signal is received and processed by a receiving section 20 of a remote unit 11 and is further processed and transmitted via a transmitting section 21 of the host unit 10.

FIG. 3 shows a functional block diagram of the digital signal processor 205 of the receiving section 20 and the digital signal processor 206 of the transmitting section 21.

The digital signal processors 205, 206 serve to isolate different subbands contained in the overall frequency band of a received RF signal for processing the subbands in an isolated, channelized form by digital processing, wherein the subbands my overlap (for example by 50%, or may be distinct in frequency and in this case do not overlap.

Figure 4:
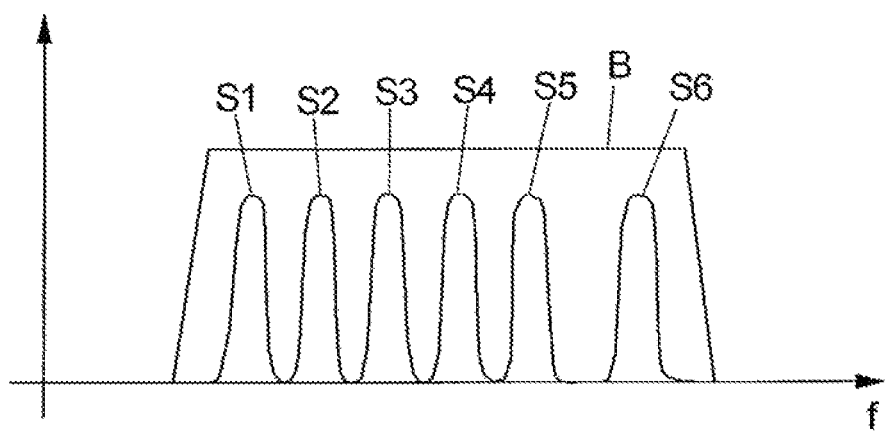
FIG. 4 shows a schematic drawing of a frequency band including multiple subbands.

In an example shown in FIG. 4, a frequency band B, for example corresponding to the complete 3GPP frequency band, may comprise multiple separate subbands S1-S6 which are separated from each other in the frequency domain and each of which is associated with a particular carrier defined by its carrier frequency. The subbands S1-S6 hence are separated in the frequency spectrum of the frequency band B, such that by separating portions of the frequency band B from each other the subbands S1-S6 and the signals contained therein may be processed in an isolated fashion.

In this regard it is to be noted that the subbands not necessarily correspond to actual carrier frequencies. Generally, a broadband signal may be split into several narrowband subband signals, the subband signals corresponding to frequency portions of the overall broadband signal.

The digital signal processor 205 of the receiving section 20 comprises a multiplicity of demodulators 301 which serve to demodulate the different signals associated with the subbands S1-S6 into the baseband. The demodulators 301 output complex digital subband signals comprising an in-phase component I and a quadrature component Q which together make up the complex digital subband signal. After the demodulator 301 the components I, Q of the digital subband signal associated with a subband are fed to digital lowpass filters 302, 303 which have a bandwidth $BW_1$ corresponding to the bandwidth of the associated subband. After the digital filters 302, 303 the components I, Q are fed to downsamplers 304, 305 in which the sampling rate of the components I, Q of the digital subband signal is decimated to the minimum acceptable value such that after passing the downsamplers 304, 305 the components I, Q have a comparatively low sampling rate.

The components I, Q of the digital subband signal associated with a subband are then fed to a power profile estimation unit 306, which is configured to compute an estimate of the momentary power contained in a digital subband signal. For this, the power profile estimation unit 306, at a particular sample time, forms the sum of the squared sample values of the in-phase component I and the quadrature component Q of the digital subband signal, which gives an estimate of the power contained in the digital subband signal at the sampling time.

In principle, the square root of the sum of the squares has to be calculated to calculate the actual power. But calculating the square root in general is costly. Therefore, for implementing a simple threshold detector the desired threshold is squared and compared against the power profile.

Figure 5:
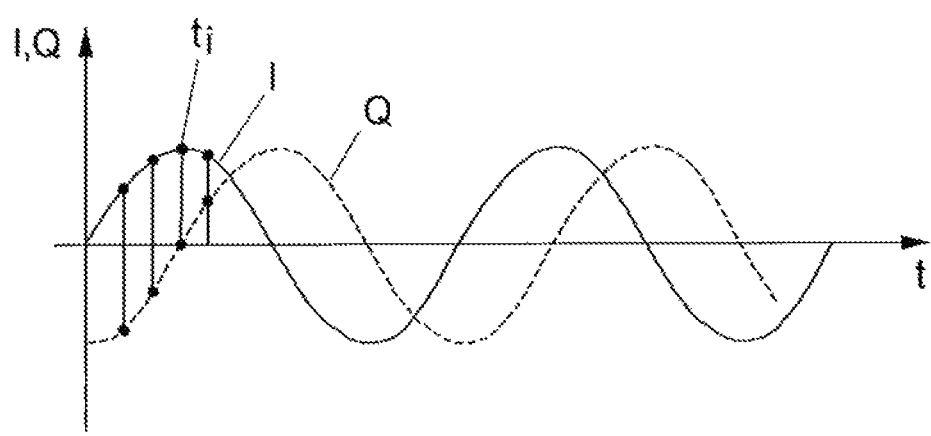
FIG. 5 shows a complex digital subband signal including an in-phase component and a quadrature component.

This is illustrated in FIG. 5, showing the in-phase component I and the quadrature component Q as a function of time t. The in-phase component I and the quadrature component Q generally have the same frequency and amplitude, but are 90° out of phase. The in-phase component I and the quadrature component Q together make up the (complex) digital subband signal associated with a subband, wherein the in-phase component I and the quadrature component Q represent digital signals digitally sampled at sampling times $t_i$. The (momentary) power contained in the digital subband signal at a sampling time $t_i$ equals the sum of the square of the sampling values of the in-phase component I and the quadrature component Q.

Based on the momentary power estimate determined in the power profile estimation unit 306 for each digital subband signal it is then decided whether to mute a digital subband signal or not. This decision may for example be taken by comparing the power estimate to a pre-determined threshold. If the power estimate of a particular digital subband signal is smaller than the threshold, then it is assumed that the digital subband signal does not carry data, but only noise, and hence it is decided to mute the digital subband signal.

However, also a more complex decision may be taken by detecting for example interfering signals or intermodulation products and muting signals relating to such interfering signals or intermodulation products.

Based on this decision, in a muting device 307 comprising switches 308, 309 the digital subband signal is muted or not. If it is decided to mute the digital subband signal, the in-phase component I and the quadrature component Q are set to zero by switching the switches 308, 309 to a lower position and hence disconnecting the digital subband signal. If it is decided not to mute the digital subband signal, the switches 308, 309 take the position as shown in FIG. 3.

The threshold may be expressed in terms of a minimum signal-to-noise ratio. For example, if the signal-to-noise ratio (SNR) for a digital subband signal is smaller than 6 dB, it may be decided to mute the digital subband signal.

The decision whether to mute a digital subband signal or not may be taken for each sampling time for which a power estimate is available. The decision hence may change in a rather fast manner for each sampling time.

After the muting device 307 the components I, Q of the digital subband signal are fed to a multistage aggregation, transport and distribution block 310 in which the different digital subband signals are aggregated to form a combined signal, are transported via the transport medium 12 and are distributed to the different remote units 11. In the multistage aggregation, transport and distribution block 310 also a multiplexing and serializing of the digital subband signals which are not muted may be carried out.

In this regard, only such digital subband signals are transported via the transport medium 12 which are not muted. Hence, if a digital subband signal is muted, it is not transported via the transport medium 12, such that it does not add to the noise of the overall system and reduces the spectrum of the transported signals.

The multistage aggregation, transport and distribution block 310 is implemented in part by means of the digital signal processor 205 on the side of the receiving section 20, in part by the transport medium 12 and in part by the digital signal processor 206 on the side of the transmitting section 21 and indicates, in a simplified form, such processing which is done on the digital subband signals for transporting it from the host unit 10 to the remote units 11 in the downlink direction or from the remote units 11 to the host unit 10 in the uplink direction.

After transportation, the digital subband signals stemming from the multistage aggregation, transport and distribution block 310 are fed to upsamplers 311, 312 in which the in-phase component I and the quadrature component Q of the separate, isolated subband signals are upsampled by interpolation or by feeding in zeroes. After digital filtering in digital filters 313, 314 for removing images arising from the upsampling the components I, Q of the different digital subband signals are fed to modulators 315, which serve to modulate the (complex) digital subband signals to produce a real digital signal for each subband in the intermediate frequency range. Such real signals are fed to a combiner 316 and are combined to a combined digital signal $IF_{OUT}$ in the intermediate frequency range. The digital signal $IF_{OUT}$ is then, as shown in FIG. 2, converted to an analog signal, is upconverted, amplified and transmitted as an analog RF signal.

In this regard it also is possible that from the transmitting section a digital signal is sent out via a digital link for example to a base station hotel in the context of a distributed antenna system in the uplink direction.

Because only such digital subband signals are transported via the transport medium 12 which contain a certain power level and which hence can be assumed to carry useful data, the overall system performance is improved in that noise or other unwanted signals of such digital subband signals are muted and not transported. Hence, for example the total noise of the system may be reduced.

The decision whether to mute a digital subband signal herein can be taken in a momentary fashion based on each power estimate for each sample available. The muting decision carried out in the muting device 307 hence may be varying in a fast manner. In addition, the muting decision may also be fed to the multistage aggregation, transport and distribution block 310 such that the network for transporting the digital subband signals may be reconfigured based on the muting decision. Herein, the reconfiguration of the network may be carried out in a slower fashion, for example only if a decision whether to mute a channel or not does not change for a pre-defined number of samples.

In the uplink direction the processing on the side of the transmission section 21 (FIG. 3) is performed at the host unit 10. Herein, multiple subbands from multiple remote units 11 are processed and combined in the combiner 316. The combining may take into account the selection of subband signals by the aggregation unit 310 such that only those subband signals of one or multiple remote units are combined for routing to one or multiple base stations of one or multiple outside networks which contain useful information and which have not been muted. This may improve the SNR in the combined signal.

The combining herein may also take a mapping to an antenna port of a base station into account such that, for routing a signal to a particular antenna port of a particular base station, only those subband signals are combined which are mapped to the particular antenna port.

In this regard the transmitting section 21 may also include multiple combiner devices 316 to produce multiple combined signals for routing, in the uplink direction, to multiple antenna ports of one or multiple base stations of one or multiple outside telecommunications networks.

The idea underlying the invention is not limited to the embodiments described above, but can be implemented also in an entirely different fashion.

For example, it in principle is not necessary to process the digital subband signals in the baseband, but it would also be possible to process the signals in an intermediate frequency band.

In addition, the bandwidths of the separate subbands do not necessarily have to be equal, but could be different for the different subbands. For example, a subband corresponding to a GSM carrier may have a different bandwidth than a carrier corresponding to a UMTS or LTE carrier, wherein subbands may also overlap in the frequency domain.

In this regard, the frequency band processed by the repeater system in general may contain different subbands associated with different radio technologies such that via the repeater system different kinds of signals can be processed and transported.

LIST OF REFERENCE NUMERALS

1 System
10 Host unit
100 Antenna
11 Remote unit
110 Antenna
12 Transport medium
20 Receiving section
21 Transmitting section
201 RF filter
202 Low-noise amplifier
203 Downconverter
204 Analog-to-digital converter
205, 206 Digital signal processor (DSP)
207 Digital-to-analog converter
208 Upconverter
209 Power amplifier
210 RF filter
301 Demodulator
302, 303 Digital filter
304, 305 Downsampler
306 Power profile estimation unit
307 Muting device
308, 309 Switch
310 Signal aggregation and transport
311, 312 Upsampler
313, 314 Digital filter
315 Modulator
316 Combiner
4 Building
40 Floor
B Frequency band
D Downlink direction
f Frequency
I In-phase component
$IF_{IN}$, $IF_{OUT}$ (Intermediate-frequency) digital signal
Q Quadrature component RF$_{IN}$ RF input signal
RF$_{OUT}$ RF output signal
S1-S6 Subbands
t Time
t$_i$ Sample time
U Uplink direction

The invention claimed is:

1. A digital repeater system for transmitting signals, comprising:
    a receiving section for processing a digital input signal, the digital input signal comprising at least one frequency band including a multiplicity of subbands associated with a multiplicity of communication channels, wherein the receiving section is configured to isolate, within the digital input signal, the multiplicity of subbands from each other to obtain digital subband signals, wherein the receiving section comprises a multiplicity of demodulators configured to demodulate the digital input signal into the baseband to obtain the digital subband signals, each digital subband signal comprising an in-phase component and a quadrature component;
    a power profile estimation unit configured to determine a momentary power estimate for each digital subband signal associated with the multiplicity of subbands at a sample time; and
    a muting device configured to mute a digital subband signal of a particular subband based on the momentary power estimate, wherein the muting device is configured to mute a digital subband signal if the momentary power estimate for the digital subband signal is smaller than a threshold; and
    at least one transmitting section, wherein the at least one transmitting section comprises a multiplicity of modulators configured to modulate unmuted digital subband signals and generate a real digital signal for each unmuted digital subband signal, wherein the transmitting section further comprises a combiner configured to combine the real digital signals to obtain a digital output signal for transmission, wherein the at least one transmitting section is configured to transmit the digital output signal or a radio frequency signal derived from the digital output signal.

2. The digital repeater system of claim 1, wherein the receiving section is configured to receive an RF input signal and to digitize the RF input signal to obtain the digital input signal; and
    wherein the at least one transmitting section is configured to convert the digital output signal to an RF output signal for transmission.

3. The digital repeater system of claim 1, wherein the power profile estimation unit is configured to determine the momentary power estimate at a particular digital sample time by adding squared digital sample values of the in-phase component and the quadrature component.

4. The digital repeater system of claim 1, wherein the receiving section comprises a multiplicity of digital filters for digitally filtering the digital subband signals.

5. The digital repeater system of claim 1, wherein the receiving section comprises a multiplicity of downsamplers for downsampling the sample rate of the digital subband signals.

6. The digital repeater system of claim 1, wherein the muting device comprises respective switches configured to switch the in-phase component and the quadrature component of the digital subband signal associated with a particular subband in order to mute the digital subband signal.

7. The digital repeater system of claim 1, wherein the receiving section is connected to the transmitting section via a transport medium.

8. The digital repeater system of claim 7, wherein prior to transmitting the digital subband signals via the transport medium, the digital subband signals are fed to an aggregation unit for aggregating the signals to be transported via the transport medium.

9. The digital repeater system of claim 8, wherein the aggregation unit takes a muting decision into account in that the aggregation unit aggregates only digital subband signals for transport via the transport medium which are not muted.

10. The digital repeater system of claim 1, wherein the digital repeater system comprises:
    a host unit; and
    at least one remote unit remote from the host unit and connected to the host unit via a transport medium.

11. The digital repeater system of claim 10, wherein the digital input signal comprises a digital uplink signal, wherein the receiving section is located in the remote unit and the at least one transmitting section is located in the host unit.

12. The digital repeater system of claim 10, wherein the digital input signal comprises a digital downlink signal, wherein the receiving section is located in the host unit and the at least one transmitting section is located in the remote unit.

13. The digital repeater system of claim 1, wherein each of the multiplicity of subbands has a narrow bandwidth, wherein the narrow bandwidth comprises a bandwidth between 150 kHz and 1 MHz.

14. The digital repeater system of claim 1, wherein the momentary power estimate for each digital subband signal is determined on a sample-by-sample basis, wherein the muting device is configured to mute a digital subband signal on a sample-by-sample basis if the momentary power estimate for the digital subband signal is smaller than a threshold.

15. A method for operating a digital repeater system for transmitting signals, comprising:
    processing a digital input signal, the digital input signal comprising at least one frequency band including a multiplicity of subbands associated with a multiplicity of communication channels;
    isolating, within the digital input signal, the multiplicity of subbands from each other to obtain a multiplicity of digital subband signals;
    demodulating, by a plurality of demodulators of the system, the digital input signal into the baseband to obtain the multiplicity of digital subband signals, each digital subband signal comprising an in-phase component and a quadrature component;
    determining, by a power profile estimation unit of the system, a momentary power estimate for each digital subband signal associated with the multiplicity of subbands at a sample time;
    muting, by a muting device of the system, a digital subband signal of a particular subband based on the momentary power estimate if the momentary power estimate for the digital subband signal is smaller than a threshold;
    modulating, by a plurality of modulators, unmuted digital subband signals to generate a real digital signal for each unmuted digital subband signal;
    combining, by a combiner, the real digital signals to obtain a digital output signal for transmission; and
    transmitting the digital output signal or a radio frequency output signal derived from the digital output signal.

16. The method of claim 15, wherein the digital input signal is processed by a receiving section of the system; and wherein at least one transmitting section of the system transmits the digital output signal or a radio frequency output signal derived from the digital output signal.

17. The method of claim 16, wherein the receiving section isolates the multiplicity of subbands from each other to obtain the multiplicity of digital subband signals.

18. The method of claim 15, wherein each of the multiplicity of subbands has a narrow bandwidth, wherein the narrow bandwidth comprises a bandwidth between 150 kHz and 1 MHz.

19. The method of claim 15, wherein the momentary power estimate for each digital subband signal is determined on a sample-by-sample basis, wherein the muting device is configured to mute a digital subband signal on a sample-by-sample basis if the momentary power estimate for the digital subband signal is smaller than a threshold.

20. A digital repeater system for transmitting signals, comprising:

a receiving section for processing a digital input signal comprising at least one frequency band including a plurality of communication channels, wherein the receiving section is configured to isolate, within the digital input signal, a plurality of subbands from each other to obtain a plurality of digital subband signals, wherein the receiving section comprises a plurality of demodulators configured to demodulate the digital input signal into the baseband to obtain the plurality of digital subband signals, each digital subband signal comprising an in-phase component and a quadrature component;

a power profile estimation unit for determining a momentary power estimate for each digital subband signal at a sample time;

a muting device configured to mute a digital subband signal if the momentary power estimate for the digital subband signal is smaller than a threshold; and at least one transmitting section for transmitting an output signal, wherein the at least one transmitting section comprises a multiplicity of modulators configured to modulate unmuted digital subband signals and generate a real digital signal for each unmuted digital subband signal, wherein the transmitting section further comprises a combiner configured to combine the real digital signals to obtain a digital output signal for transmission, wherein the at least one transmitting section is configured to transmit the digital output signal or a radio frequency signal derived from the digital output signal.

* * * * *